(No Model.)

W. T. BLEIKE, Jr.
POULTRY COOP.

No. 293,138. Patented Feb. 5, 1884.

Attest:
Herbert Knight
S. M. Hopkins

Inventor:
Wm. T. Bleike Jr.
By Knight Bros
Attys

UNITED STATES PATENT OFFICE.

WILLIAM T. BLEIKE, JR., OF GALVESTON, TEXAS.

POULTRY-COOP.

SPECIFICATION forming part of Letters Patent No. 293,138, dated February 5, 1884.

Application filed April 27, 1883. (No model.)

*To all whom it may concern:*

Be it known that I, WILLIAM T. BLEIKE, Jr., of Galveston, Galveston county, Texas, have invented a certain new and useful Improvement in Poultry-Coops, of which the following is a full, clear, and exact description, reference being had to the accompanying drawings, forming part of this specification, and in which—

Figure 1:
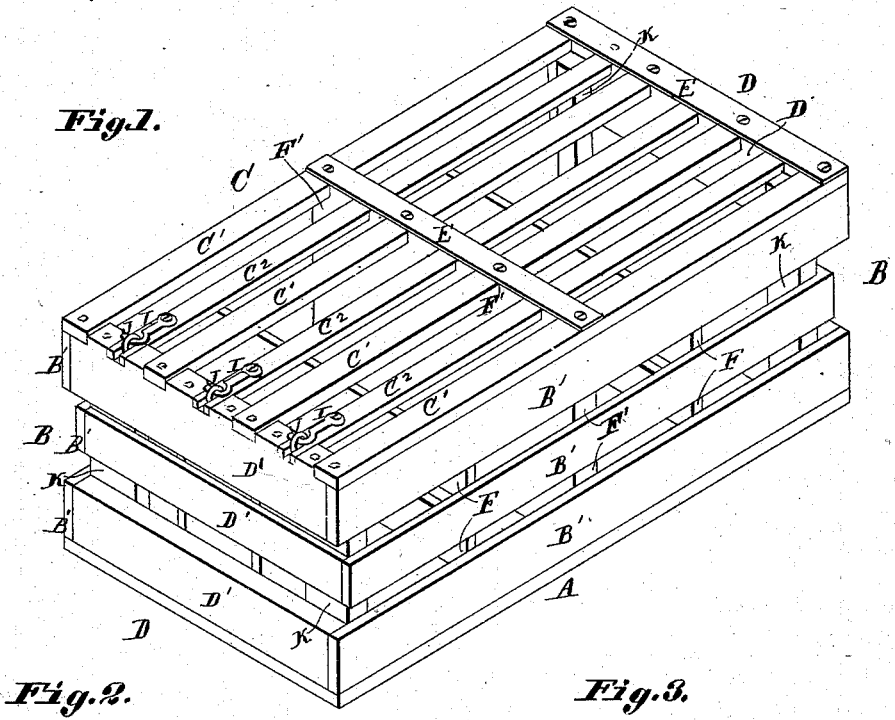
Figure 2:
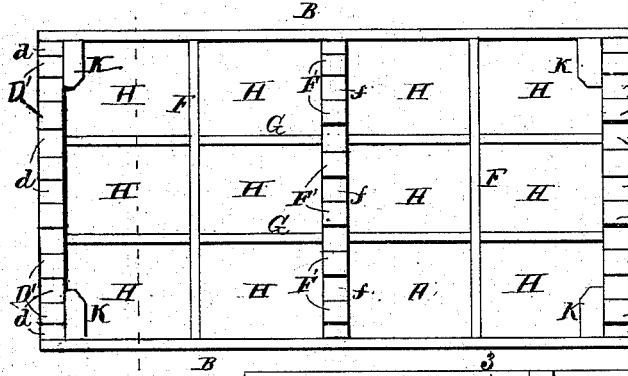
Figure 3:
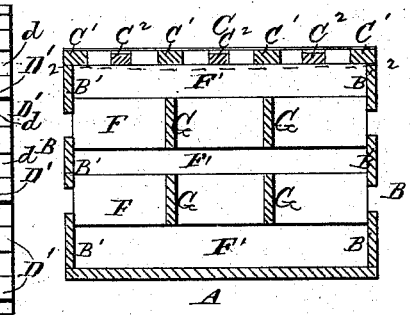
Figure 4:
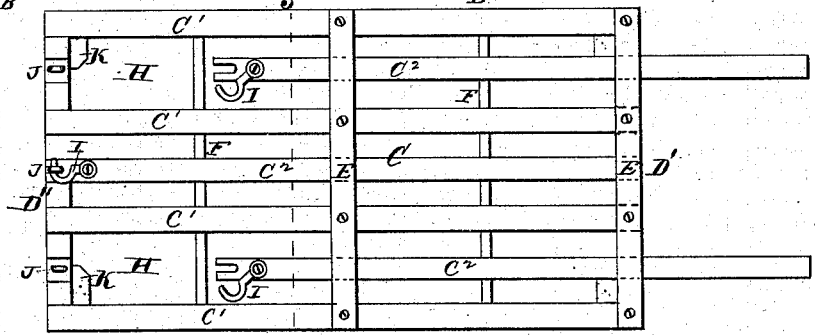

Figure 1 is a perspective view; Fig. 2, a horizontal section taken on line 2 2, Fig. 3. Fig. 3 is a vertical transverse section taken on line 3 3, Fig. 4; and Fig. 4 is a top view.

My invention consists in an improved construction of coop, hereinafter described, and pointed out in the claims.

Referring to the drawings, A represents the bottom of the coop, B B the sides, C the top, and D D the ends. The bottom is preferably made solid, as shown in Fig. 3. The sides preferably consist of strips B', the ends of strips D', and the top of stationary strips C' and sliding strips $C^2$. The top has also transverse tie-strips E.

K are corner-posts.

The interior of the coop has a vertical central partition, F', between which and the ends of the coop are vertical transverse partitions F and vertical longitudinal partitions G, which preferably consist of strips, as shown, forming compartments H, each of a sufficient size to contain a given number of a given kind of poultry, which is a great convenience to poultry shippers and carriers in receipting for the poultry by number—as, for instance, a coop with twelve compartments each compartment holding three full-grown chickens, ducks, &c., or four young of the same kind, would contain, in all, thirty-six full-grown or forty-eight young chickens, ducks, &c., and as the coop is divided off into compartments the poultry can with great ease be examined as to condition, and not being in a large mass, but being separated into small numbers, they are kept in a better state of preservation and health while being thus confined. There are numerous other advantages arising from the use of a coop of my improved construction which it will be unnecessary to mention herein.

The sliding strips $C^2$ are held in place between the partitions F, central partition, F', having recesses $f$, and top end strips having recesses $d$, in which the slats fit, and the transverse pieces E, and they are thus allowed free end movement to expose any one or more of the compartments H. (See Fig. 4.) These slats are held in their closed position by hooks I and staples J, as shown.

The coop may be constructed of any suitable material of any suitable size, and with any desired number of compartments.

I claim as my invention—

1. In a poultry-coop, the combination of bottom A, side strips, B', end strips, D', the top end strips having recesses $d$, central vertical partition, F', having recesses $f$, vertical transverse partitions F, and vertical longitudinal partitions G, forming compartments H, between the central partition and the ends of the coop, corner-posts K, and the top strips, C' $C^2$, fitting in the recesses, as set forth.

2. In a poultry-coop, the combination of bottom A, side strips, B', end strips, D', the top end strips having recesses $d$, central partition, F', having recesses $f$, corner-posts K, vertical transverse partitions F, and vertical longitudinal partitions G, forming compartments H, the top fixed and removable strips, C' $C^2$, having suitable fastenings and fitting in the recesses, and transverse tie-strips E, as set forth.

WILLIAM T. BLEIKE, JR.

Witnesses:
HENRY T. HOOPER,
JAMES T. SPANN.